June 12, 1945.  F. C. REGGIO  2,378,036
FUEL METERING DEVICE
Filed July 7, 1941  2 Sheets-Sheet 2
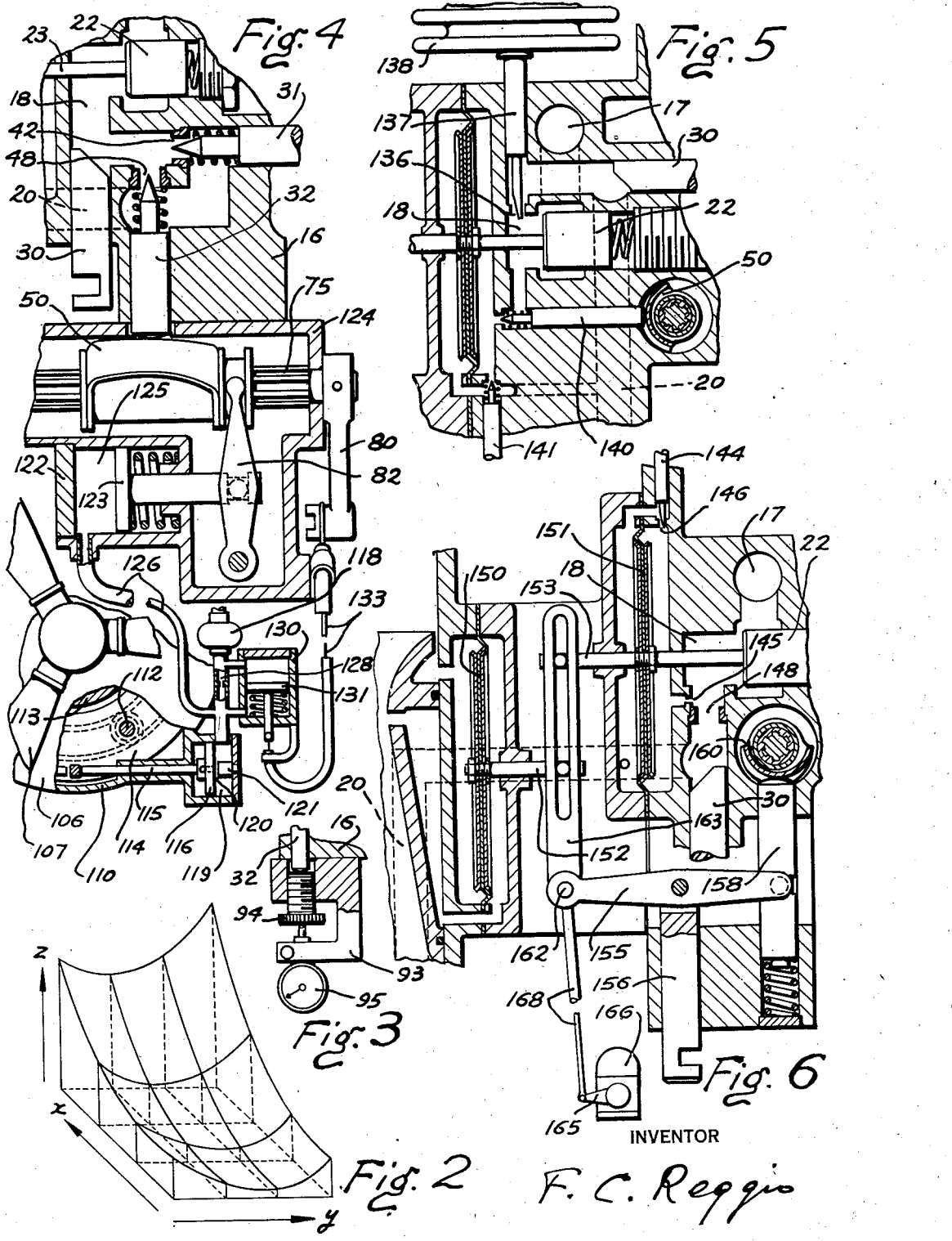
INVENTOR
F. C. Reggio Patented June 12, 1945

2,378,036

UNITED STATES PATENT OFFICE 2,378,036

FUEL METERING DEVICE

Ferdinando Carlo Reggio, Buffalo, N. Y.

Application July 7, 1941, Serial No. 401,353

37 Claims. (Cl. 123—119)

This invention relates to carburetors, charge forming devices and fuel metering systems for internal combustion engines, and is particularly adapted for use in aircraft engines. Insofar as the subject matter is common, it is a continuation in part of my copending application Serial Number 254,355 filed Feb. 3, 1939.

In conventional carburetors, the fuel-air ratio of the combustible mixture supplied to the engine cylinders varies substantially as a function of a single parameter, usually the engine air consumption, regardless of other engine operative conditions such as speed, load and operative temperatures, the result being that the engine is supplied with combustible mixture having a definite value of fuel-air ratio whenever its air consumption has a certain corresponding value, regardless of whether it is operating under high torque and low speed, or medium torque and medium speed, or low torque and high speed, and regardless of whether the engine is being effectively or poorly cooled.

One of the principal objects of the present invention is to provide a carburetor, charge forming devices or other fuel metering arrangement which regulates the fuel-air mixture ratio automatically in dependence upon one or more preselected engine operative conditions. A more specific object is to provide a fuel metering device having means for varying the engine fuel-air ratio as a predetermined fuction of at least two independent variables, the latter being related to engine operative conditions. By way of example, such independent variables or parameters may be related to the engine speed and the engine manifold air pressure; or the engine speed and torque; or the engine air consumption and an engine operative temperature such as the exhaust temperature or the temperature of the cylinder head or any suitable part connected therewith; or they may be related to other conditions such as the surrounding atmospheric conditions, or the exhaust counter-pressure, or the propeller pitch in connection with engines provided with constant-speed propellers, etc., or any suitable function or combination thereof.

Another object of the invention resides in the provision of a mixture control arrangement for automatically varying the fuel-air mixture ratio in dependence upon three parameters related to engine operative conditions and susceptible of manual adjustment.

A further object resides in the provision of an operative arrangement for the direct and accurate determination of the configuration which the mixture control means must have in order to automatically adjust the fuel-air ratio of the combustible mixture as a given function of two parameters. Such function, which may be represented analytically by the equation $z=f(x,y)$, where $z$ is the fuel-air ratio and $x$ and $y$ are two parameters related to engine operative conditions, or graphically by a surface referred to three orthogonal axes as in Fig. 2, generally is, or may easily be, determined for each type of engine to represent the optimum values of the mixture ratio corresponding to the various values of the parameters $x$ and $y$.

Another object is to provide common means for automatically controlling the fuel-air ratio and the ignition timing.

A still further object resides in the provision of a device for automatically varying either the fuel-air ratio of the combustible mixture or the engine ignition timing, or both, as predetermined functions of two parameters depending on engine operative conditions.

The above and other objects of the invention will be apparent as the description proceeds; and while I have illustrated and described by way of example the preferred embodiments of the invention as they now appear to me, it will be understood that such changes may be made as fall within the scope of the appended claims. In the following description and in the claims various details will be identified by specific names for convenience, but they are intended to be as generic in the application as the art will permit.

In the drawings:

Fig. 2 is a graphic representation of fuel-air mixture ratio $z$ varying as a function of two parameters $x$ and $y$;

Fig. 3 shows part in section and part in elevation a convenient arrangement for the direct determination of the configuration of the mixture control means;

Figs. 4 and 5 are fragmentary sections showing modification of the carburetor illustrated at Fig. 1; and Fig. 6 is a fragmentary section showing another partial modification of Fig. 1, further including means for the automatic regulation of both the fuel-air mixture ratio and the engine ignition timing in dependence up at least two parameters.

Figure 1:
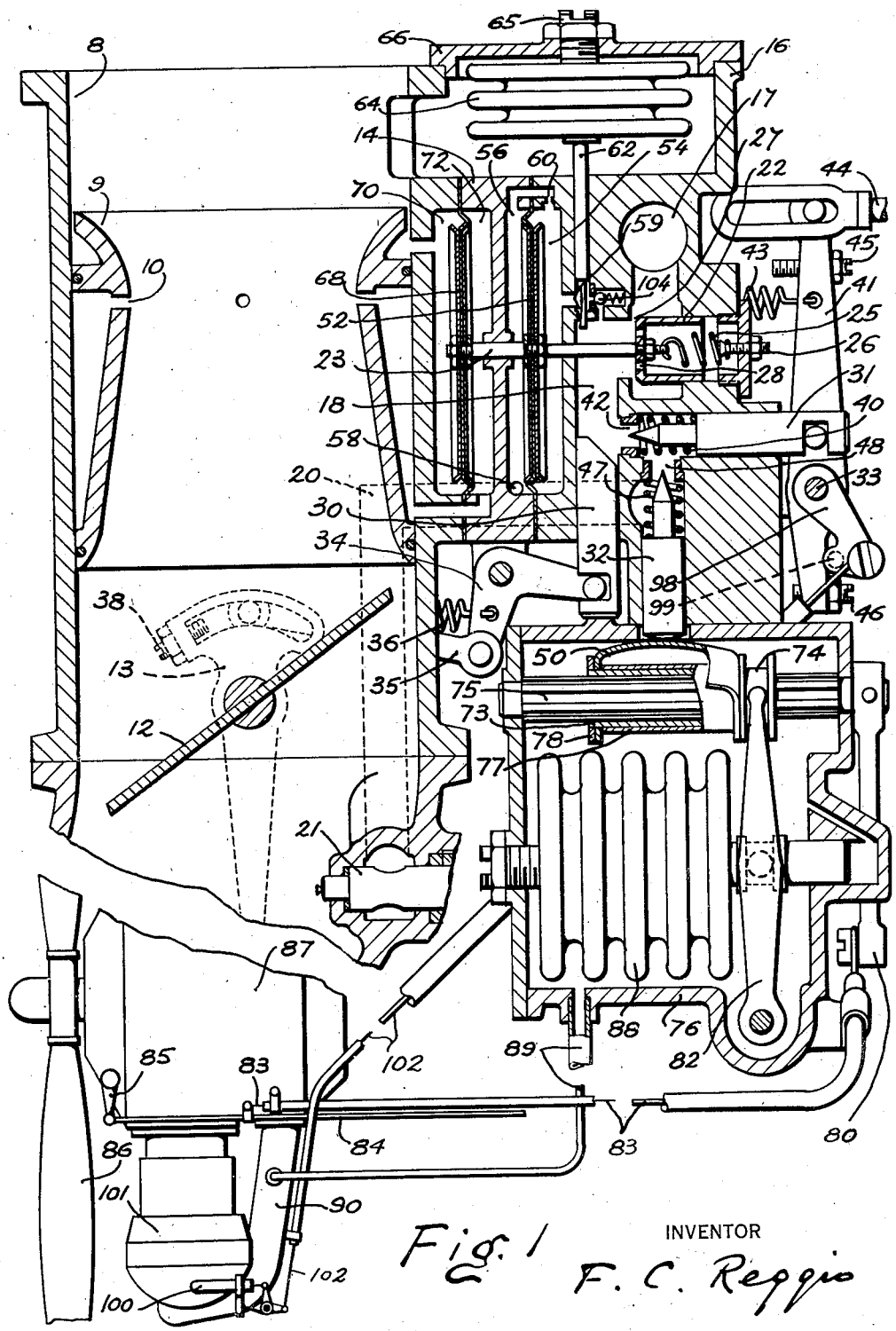
Fig. 1 is a section through one of the preferred embodiments of the invention.

While in the drawings a single barrel carburetor is represented, it will be obvious to those skilled in the art that the metering devices of the invention may be applied to multibarrel carburetors.

The carburetor barrel 8 includes a Venturi tube 9 having holes 10 at the throat thereof and a butter fly valve 12 connected with a throttle lever 13. Housing elements 14 and 16 are secured to the barrel, defining certain chambers and including a fuel inlet duct 17 receiving fuel under pressure from a fuel supply source or pump, not shown, and communicating with ducts 18 and 20 for leading fuel to a discharge nozzle 21 which may be mounted in any suitable part of the engine air induction system, preferably downstream with respect to the Venturi tube in a location where the operating temperature is sufficiently high to eliminate icing hazards. A slidable valve 22 attached to a rod 23 and provided with a tension spring 25 attached to an adjustable swivel bolt 26 controls the effective area of an annular flow restricting orifice 27. Passages 28 maintain the fuel pressure at equal values on both sides of valve 22. Arranged in series between ducts 18 and 20 there are three fuel flow restricting valves 30, 31 and 32. The idle valve 30, operated by way of lever 34 and rod 35 having a lost motion connection with throttle lever 13, is held in open position by a spring 36 whenever the throttle valve 12 is open. When the latter is in closed position, corresponding to engine idling, the valve 30 is lifted to reduce the effective area of orifice 42 and the fuel flow to a value adjustable by means of the idle adjusting screw 38. Valve 31, controlling the effective area of orifice 42 and outwardly urged by spring 40, is actuated by lever 41 rotatably mounted on pivot 33 carried by the housing 16. Lever 41, whose angular displacement is limited by adjustable screws 45 and 46, has a lost motion connection with a control rod 44 and is urged in anticlockwise rotation by a spring 43. The valve 32, controlling the effective area of orifice 48 and thrust downwardly by a spring 47, is actuated by a cam 50.

A flexible diaphragm 52, attached to the slidable rod 23, provides a movable wall between the fuel chambers 54 and 56, the latter connected with duct 20 by way of a comparatively large conduit 58, and the former having fuel flow communications with duct 18 and with chamber 56 by way of small orifices 59 and 60 respectively, the former orifice being adjustable by a sliding displacement of a valve 62 attached to an expansible bellows or capsule 64 supported by way of an adjustable screw 65 by housing cover 66. Bellows 64 contains a certain weight of dry air or other suitable fluid; and its axial dimension, as well as the adjustment of valve 62 and the effective area of orifice 59, therefore vary upon changes of pressures and temperature of the air in barrel 8. A second flexible diaphragm 68, also attached to rod 23, provides a movable wall between chambers 70 and 72 communicating with barrel 8 and with the Venturi openings 10 respectively. The fuel nozzle valve 21 is preferably of the well known type designed to maintain the upstream fuel pressure approximately constant. In operation, therefore, the pressure in duct 20 is substantially the same for all operative conditions, and will be equal the pressure in duct 18 minus the loss of pressure head due to the flow of fuel past the orifices 42 and 48.

The fuel pressure in chamber 56 is the same as in duct 20, while in chamber 54, owing to the effect of the small orifices 59 and 60, the fuel pressure has a value $p_m$ dependent on the ratio of said small orifices and defined by the following relation:

$$p_a - p_b = (p_m - p_b)\left(1 + \frac{s_2^2}{s_1^2}\right) \quad (1)$$

where $p_a$ and $p_b$ are the pressures in ducts 18 and 20 respectively, and $s_1$ and $s_2$ are the effective areas of orifices 59 and 60 respectively.

In operation, the flow of air through the venturi is related to the difference of pressure between chambers 70 and 72, acting on diaphragm 68 and tending to open the valve 22, according to the familiar relation:

$$W_a = K_1\sqrt{\delta(p_1 - p_2)} \quad (2)$$

where $W_a$ is the weight of air flowing through the venturi in the unit time, $\delta$ is the air density therein, $p_1$ and $p_2$ are the pressures in chambers 70 and 72 respectively, and $K_1$ is a constant depending on the dimensions of the venturi.

Fuel flows from inlet 17 through orifice 27 controlled by valve 22 to duct 18 and thence through the two orifices 42 and 48 arranged in series to the duct 20 connected with the discharge nozzle 21. As already stated, the fuel pressure in duct 20 is kept approximately constant owing to the particular discharge characteristic of valve 21, and the fuel flow through orifices 42 and 48 is related to the difference of pressure between ducts 18 and 20 according to the following equation:

$$W_f = K_2 \frac{S_1 S_2}{\sqrt{S_1^2 + S_2^2}} \sqrt{p_a - p_b} \quad (3)$$

where $S_1$ and $S_2$ are the effective areas of orifices 42 and 48 respectively, $W_f$ is the weight of fuel flowing past said orifices in the unit time, $p_a$ and $p_b$ are the pressures in ducts 18 and 20 respectively, and $K_2$ is a constant depending on the specific weight of the fuel. The fuel supplied to the engine by nozzle 21 is equal $W_f$ plus the amount of fuel flowing past orifices 59 and 60. The latter amount, owing to the small size of said orifices, is so small as compared with $W_f$ that it may be neglected in the computation of the fuel-air ratio, when the engine operates under load, in the present simplified analysis of the carburetor operation.

The valve 22, actuated by diaphragms 52 and 68, maintains the difference of pressure between chambers 54 and 56 equal to the difference of pressure between chambers 70 and 72, as the load of the idle spring 25 may be neglected in comparison with the pressures applied to said diaphragms when the engine is under load. When the effort transmitted by diaphragm 68 to rod 23 increases, as for example upon opening of the throttle valve 12, the valve 22 is displaced toward the right, thus increasing the fuel pressures in duct 18 and in chamber 54 as well as the engine fuel supply, and reestablishing the equilibrium of the two diaphragms. Conversely, when the load on diaphragm 68 decreases, the valve 22 is displaced toward the left to accordingly reduce the fuel pressure in duct 18 and in chamber 54 and the engine fuel supply.

The function of the diaphragms and of the valve 22 is therefore to maintain:

$$p_1 - p_2 = p_m - p_b \quad (4)$$

From the above relations 1 to 4 the following expression of the fuel-air ratio R is obtained:

$$R = \frac{W_f}{W_a} = K_3 \frac{S_1 S_2}{\sqrt{S_1^2 + S_2^2}} \sqrt{\frac{1 + \frac{s_2^2}{s_1^2}}{\delta}} \quad (5)$$

where $K_3$ is a constant depending on $K_1$ and $K_2$.

The capsule or bellows 64 contains a dry gas and is sensitive to the pressure and temperature of the air in barrel 8. In one of the preferred embodiments of the invention the end of needle 62 which controls the effective area $s_1$ of orifice 59 and whose adjustment is dependent on the air density $\delta$, is designed so as to maintain constant the value of the fraction under the last radical sign in Equation 5. A configuration of needle valve 62 which fulfills this requirement can be readily determined when the characteristic of the density responsive capsule is known.

It is therefore clear from Equation 5 that the fuel-air ratio R is determined by the values of $S_1$ and $S_2$, that is by the adjustment of valves 31 and 32. The latter valve is actuated by an axially and angularly adjustable cam 50 shown in the drawings as a stamped piece, made for example of steel sheet, surface-hardened and secured to a splined hub 73 provided with a groove 74 and slidable on a splined shaft 75 rotatably supported by a casing 76 attached to housing 16. A spacing tube 77 and a retaining end washer 78 secure the necessary rigidity to the cam. A lever 80 carried by shaft 75 and a lever 82 pivoted to the housing 76 and cooperating with groove 74 serve to control the angular and axial adjustment of cam 50 respectively.

According to the present invention levers 80 and 82 may be actuated by automatic devices responsive to any suitable engine operative conditions, or functions or combinations thereof. An example of one of the embodiments which appear at present as particularly convenient is illustrated in Fig. 1 in which the carburetor is connected with an aircraft engine driving a variable-pitch constant-speed propeller 86. An engine driven governor, not shown in the drawings, adjusts the pitch of propeller 86 to maintain the speed of engine 87 at a value determined by the adjustment of the governor control lever 85, which lever may be actuated by the pilot by way of rod 84. This arrangement is well known and it is therefore regarded unnecessary to describe it in further detail. A flexible wire 83 connects lever 80 with rod 84, while lever 82 is actuated by a resilient bellows 88 enclosed in the air-tight housing 76 communicating by way of pipe 89 with the air induction manifold 90 leading air from the supercharger to the cylinders of engine 87. The angular and axial adjustments of cam 50 are therefore dependent on engine speed and manifold air pressure.

In the particular carburetor of Fig. 1 the fuel-air ratio is thus automatically varied as a certain function of speed and manifold pressure determined by the configuration of cam 50, and may be graphically represented as in Fig. 2 by a surface referred to three orthogonal axes $x, y, z$, in which the fuel-air ratio is $R=z=f(x,y)$, $x$ and $y$ being the engine speed and the manifold air pressure.

In general, the optimum values of the fuel-air ratio corresponding to each combination of $x$ and $y$ values will be determined by the engine manufacturer for each type of engine, representing the best compromise between power output, fuel economy, operating temperatures, etc., while the carburetor manufacturer shall determine the configuration of the corresponding cam 50. For the latter purpose the housing 76 may be removed from the carburetor and a support member 93, shown in Fig. 3, may be attached to housing 16, said support carrying a finely threaded screw 94 coaxial with valve 32 for adjusting the latter, and an indicator 95. All values of the fuel-air ratio within the designed limits may be obtained by adjusting the screw 94. The configuration of cam 50 may be directly determined by engine tests during which the screw 94 is adjusted, for each combination of $x$ and $y$ values, until the specified value of fuel-air ratio is obtained, and the corresponding adjustment of valve 32 is then read on the indicator 95.

While the foregoing regulation of the fuel-air ratio is obtained by means of the automatic control of the effective area $S_2$ of orifice 48, it is clear from Equation 5 that said ratio may be further modified by altering the effective area $S_1$ of orifice 42, thus permitting further variation of the mixture ratio either manually by the pilot or automatically in response to other engine operative conditions. In the arrangement of Fig. 1 a lever 98 rotatably mounted on pivot 33 carries a pin 99 adapted to come into contact with lever 41 to rotate the latter clockwise. A temperature responsive element 100 mounted preferably on or near the head of cylinder 101 of engine 87 and sensitive to the exhaust temperature or to the temperature of any suitable part of or connected with the cylinder head, is connected by a flexible wire 102 with lever 98 to rotate the latter clockwise whenever the controlling temperature exceeds a predetermined value. As the moment applied to lever 41 by the tension spring 43 is greater than that due to spring 40, the valve 31 is normally kept in its innermost position determined by the adjustable screw 45, and the fuel-air ratio varies as that optimum function of $x$ and $y$ referred to above. However if the temperature of element 100 attains a comparatively high value, brought about for example by prolonged operation of the engine at high power output, or by a long climb of the aircraft during which the engine cooling is poor, lever 41 is caused to rotate clockwise, outwardly displacing valve 31, increasing the effective area $S_1$ of orifice 42, and causing a mixture enrichment. The maximum value of area $S_1$ is determined by the adjustment of screw 46. Mixture enrichment may also be obtained by means of the manually controllable rod 44.

During idling operation, the load on diaphragm 68 is very small and the difference of fuel pressure between conduits 18 and 20 is determined substantially by the idle spring 25. In order to improve engine acceleration a spring-loaded valve 104 is provided between duct 18 and chamber 54. Said valve, which is closed during steady engine operation, is adapted to open when the pressure in said chamber momentarily exceeds that in duct 18 upon sudden opening of throttle valve 12, to allow quick exit of fuel from chamber 54 and rapid displacement of diaphragm 52 toward the right.

It is to be clearly understood, as already stated above, that the present invention is not limited to a carburetor in which the mixture ratio is automatically controlled as a function of the engine speed, induction pressure, and of an engine operative temperature. According to the invention, condition-controlling means other than the engine speed control member 84 and/or condition-responsive means other than the induction pressure actuated bellows 88 and the temperature-responsive element 100 may be operatively connected with levers 80, 82 and 98, as it will be appreciated that the optimum combination of engine operative conditions upon which the mixture ratio should be dependent may not be the same for engines having different operative conditions or employed under different conditions.

The upper part of Fig. 4 shows a modified arrangement of the carburetor, in which the orifices 42 and 48, controlled by valves 31 and 32 respectively, are disposed in parallel between ducts 18 and 20, instead of in series as in Fig. 1. The Equation 5 must be accordingly modified by substituting therein the sum $s_1+s_2$ instead of the first fraction of the second member thereof.

In the lower part of Fig. 4 there is indicated a cam 50 the axial adjustment of which is dependent on the torque transmitted by the aircraft engine 106, with which the carburetor is connected, to the propeller 107. Since engine torque and brake mean effective pressure are proportional, it may be stated that the adjustment of cam 50 is also dependent upon changes of brake mean effective pressure. In the diagrammatic section in reduced scale through the engine nose perpendicular to the crankshaft thereof, 110 is the housing of the planetary reduction gear having planet pinions carried by journals 112 supported by an annular member, not shown, rotatable with the shaft of propeller 107 and engaged between a sun gear 113 secured to the engine crankshaft and an outer ring gear 114. The latter is prevented from rotating by means of an axial extension 115 of a pressure loaded piston 116 for providing a hydraulic torque meter, this being a known device. An engine driven pump 118 discharges oil under pressure into chamber 119 at one side of piston 116 for acting against the tangential load, proportional to the propeller torque, transmitted thereto by the outer ring gear 114. Oil escapes from chamber 119 by way of a restriction 120, the effective area of which is dependent on the distance between piston 116 and a pin 121 carried by the cylinder cover. Piston 116 is normally in equilibrium between the opposite loads transmitted thereto by the propeller torque and the oil pressure in chamber 119. An increase of torque causes a displacement of piston 116 toward the right thereby reducing the open area of orifice 120 and increasing the oil pressure in chamber 119 until the equilibrium of piston 116 is reestablished.

A cylinder 122 including a resiliently loaded piston 123 connected with lever 82 is provided in cam housing 124. The cylinder chamber 125 at one side of piston 123 communicates by way of pipe 126 with chamber 119, whereby the axial adjustment of cam 50 is determined by the propeller torque. The oil delivery of engine-driven pump 118, proportional to the engine speed, before reaching the cylinder 119 flows past an orifice 128, preferably of the thin-edge type characterized by the fact that the pressure drop therepast caused by the flow of a fluid is not appreciably affected by changes of viscosity of the latter. A cylinder 130 including a resiliently loaded piston 131 is in communication, at opposite sides of said piston, with the oil duct upstream and downstream of orifice 128 respectively, so that the adjustment of said piston, and in turn the angular adjustment of lever 80 connected therewith by way of a flexible wire 133, and the angular adjustment of cam 50 are dependent on the engine speed. In the arrangement shown in Fig. 4 the needle valves 31 and 32 are arranged in parallel, while the same valves 31 and 32 are disposed in series in Fig. 1, but it has been shown analytically that their function remains substantially unchanged. According to one of the preferred embodiments of the invention the needle valve 31 of Fig. 4 is actuated by the same elements and in the same way as the needle valve 31 of Fig. 1, and it is therefore regarded as unnecessary again to show in Fig. 4 the same structure connected with valve 31 for operating the latter which has already been illustrated in Fig. 1. It is thus clear that the carburetor according to the partial modification shown in Fig. 4 controls the mixture ratio in dependence upon the engine speed, the engine or propeller torque, and an engine operative temperature, and that said mixture ratio may further be adjusted by way of manually operable control means.

When between ducts 18 and 20 there is only one major restricting orifice 136 having an effective area S controlled by a valve 137, as in Fig. 5, the Equation 5 becomes:

$$R = K_3 \frac{S}{V\delta} \sqrt{1 + \frac{s_2^2}{s_1^2}} \qquad (6)$$

Valve 137, actuated by capsule 138 sensitive to the air density in the carburetor barrel, is designed in accordance to the characteristic of the capsule in such way as to vary S proportionally to the square root of said density. It is therefore apparent from (6) that the fuel air ratio is determined by the values of $s_1$ and $s_2$, that is by the adjustment of the small needle valves 140 and 141 respectively. One of said valves is actuated by a cam 50 as already described, which cam may be adjusted in dependence upon two engine operative conditions such for instance as engine speed and induction pressure, or engine speed and torque as disclosed in connection with the foregoing examples, while the remaining needle valve 141 may be actuatable manually by the pilot and automatically by suitable devices sensitive to engine or aircraft operating conditions such as an operative temperature.

A further partial modification of the arrangement of Fig. 1 is shown in Fig. 6, in which the valve 144 actuated by the density responsive capsule controls the effective area $s_2$ of orifice 146, while the area $s_1$ of orifice 145 is constant. Valve 144 is designed to vary the effective area $s_2$ upon changes of air density so as to maintain the numerator of the fraction under radical sign in Equation 5 proportional to the denominator thereof. The main orifice 148 between fuel ducts 18 and 20 also has constant area. The air-actuated and the fuel-actuated diaphragms 150 and 151 are attached to slidable parallel rods 152 and 153 respectively. The latter rod controls the fuel valve 22. A lever 155 is rotatably mounted on a pin carried by an axially slidable rod 156 and has at one end a pin and groove connection with a spring-loaded rod 158 actuated by an axially and angularly adjustable cam 160, and at the other end carries a pin 162 on which there is journaled a floating lever 163 having pin and slot connections with rods 152 and 153. The load on diaphragm 151, due to the difference of fuel pressure between ducts 18 and 20, which balances a given load on diaphragm 150, is clearly determined by the distance of pin 162 from rods 152 and 153, the result being that the fuel-air ratio is determined by the adjustment of cam 160 and rod 156. According to one of the preferred embodiments of the invention the cam 160 of Fig. 6 is similar to cam 50 of Fig. 1 and is actuated in similar manner by means of an engine manifold pressure responsive device such as the bellows 88; and is also operatively connected with an engine speed control member such as the rod 84.

It is therefore to be clearly understood that the same elements and structure shown in Fig. 1 for actuating the cam 50 and the slide valve 31 are used in connection with the device of Fig. 6 to actuate cam 160 and sliding rod 156 respectively. Cam 160 is thus caused to slide in response to changes of engine manifold air pressure and to rotate with changes of engine speed, and rod 156 is caused to slide upon variations of an engine operative temperature, and may be actuated manually. Therefore the carburetor illustrated in part in Fig. 6, the non-illustrated parts whereof are to be found in Fig. 1, automatically controls the fuel-air ratio in dependence upon the engine speed, the engine manifold pressure, and an engine temperature, and said ratio may be further controlled manually. It is to be further noted that in this carburetor the fuel-air ratio is determined by the adjustment of a single member 155.

The arrangement of Fig. 6 lends itself to the automatic variation of the engine ignition timing in dependence upon the fuel-air ratio by the provision of an operative connection between pivot 162 and the timing control member 165 of magneto 166 or equivalent ignition device. Such connection is diagrammatically indicated in Fig. 6 by a rod 168, but it is obvious that it may include cam means and floating lever means also operatively connected with manual controls and automatic devices sensitive to engine operative conditions.

These embodiments of the invention have been shown merely for purpose of illustration and not as a limitation of the scope of the invention. It is therefore to be expressly understood that the invention is not limited to the specific embodiments shown, but may be used in various other ways, and various modifications may be introduced to suit different requirements, and that other changes, substitutions, additions and omissions may be made in the construction, arrangement and manner of operation of the parts within the scope or limits of the invention as defined in the following claims. In particular, while the cam disclosed in the foregoing examples is slidable and rotatable, according to the invention it may have two other orders of adjustment, for example it may be slidably adjustable in two different directions.

Where the claims are directed to less than all of the elements of the complete system disclosed, they are intended to cover possible uses of the recited elements in installations which may lack the non-recited elements.

Certain features disclosed herein are claimed in my copending patent application Serial No. 254,355, filed February 3, 1939, and in my copending patent application Serial No. 523,192, filed February 21, 1944.

What I claim is:

1. In a carburetor, in combination with a venturi, fuel valve means, air pressure differential responsive means connected with said venturi, fuel pressure differential responsive means, and means for operatively connecting said three first mentioned means, an adjustable fuel flow restriction, means responsive to carburetor air inlet pressure and temperature for controlling said restriction to correct the fuel supply for variations of carburetor air density, adjustable fuel flow restricting means for controlling the fuel-air mixture ratio, and means for altering the adjustment of said flow restricting means with changes of at least one engine operative condition.

2. In a carburetor, in combination with a venturi, adjustable fuel flow restricting means, air pressure differential responsive means connected with said venturi, fuel pressure differential responsive means connected by fuel conduit means with the upstream and downstream sides of said restricting means, and fuel valve means actuated by said air and fuel pressure differential responsive means, an adjustable orifice in said fuel conduit means, means responsive to carburetor air pressure and temperature for controlling said orifice, a warped surface for adjusting said fuel flow restricting means to control the fuel-air mixture ratio, and means for varying the relative adjustment of said surface and flow restricting means with changes of engine operative conditions to automatically control said mixture ratio.

3. In a carburetor, in combination with a venturi, fuel pressure regulating means, and air pressure differential responsive means connected with said venturi and fuel pressure differential responsive means for actuating said pressure regulating means, an adjustable fuel flow restriction, means responsive to carburetor air inlet pressure and temperature for controlling said restriction to render the fuel-air mixture ratio substantially independent of carburetor air density, two adjustable fuel flow restricting orifices for controlling said mixture ratio, cam means adjustable in two ways and having a warped surface for adjusting one of said orifices, additional means for adjusting the other of said orifices, and means for varying the adjustment of said cam means in said two ways and of said additional means with changes of preselected engine operative conditions.

4. In an engine carburetor, in combination with a venturi, fuel pressure regulating means, and air pressure differential responsive means connected with said venturi and fuel pressure differential responsive means for actuating said pressure regulating means, an adjustable fuel flow restricting orifice, means responsive to carburetor air pressure and temperature for adjusting said orifice whereby the fuel-air mixture ratio is substantially independent of the carburetor air density, fuel flow restricting means for controlling said mixture ratio, and means responsive to changes of an engine operative temperature and operatively connected with said flow restricting means to increase said mixture ratio upon an increase of said engine operative temperature.

5. An engine carburetor including, in combination with a venturi, fuel pressure differential regulating means, and air pressure differential responsive means connected with said venturi for actuating said first mentioned means, an adjustable fuel flow restricting orifice, means responsive to changes of carburetor air inlet pressure and temperature for adjusting said orifice to keep the fuel-air mixture ratio substantially independent of changes of carburetor air density, fuel flow restricting means for controlling said mixture ratio, cam means adjustable in two ways for adjusting said flow restricting means to regulate said mixture ratio, and means for varying the adjustment of said cam means in said two ways with changes of engine speed and torque.

6. An engine carburetor including fuel-air mixture control means, a warped surface movable in two ways for adjusting said means, means for altering the adjustment of said surface in said two ways upon changes of engine speed and torque and manual control means for actuating said mixture control means.

7. An engine carburetor having means for controlling the fuel-air ratio, a controlling surface movable in two ways relatively to said means for adjusting the latter, and means for altering the relative adjustments of said surface and first mentioned means in said two ways with changes of engine speed and manifold air pressure.

8. An engine carburetor having means for controlling the fuel-air ratio, a controlling surface movable in two ways for adjusting said means, and means for altering the adjustments of said surface in said two ways with changes of engine speed and torque.

9. In a carburetor, in combination with a venturi, air pressure differential responsive means connected with said venturi, and carburetor air pressure and temperature responsive means, cam means adjustable in two directions and having a warped surface, means for altering the adjustment of said cam means in said two directions with changes of preselected engine operative conditions, and means actuated by said three first mentioned means for controlling the fuel supply in dependence on said Venturi pressure differential, on said carburetor air pressure and temperature, and on said engine operative conditions.

10. An engine carburetor including; in combination with a venturi, air pressure differential responsive means connected with said venturi, and carburetor air inlet pressure and temperature responsive means, cam means adjustable in two ways and having a warped surface, means responsive to a first engine operative condition, means for altering the adjustment of said cam means in said two ways with changes of a second and third engine operative conditions, and means actuated by said four first mentioned means for regulating said fuel supply in dependence on said Venturi air pressure differential, on said carburetor air inlet pressure and temperature, and on said three engine operative conditions.

11. A carburetor for an engine having an adjustable ignition timing device, said carburetor including fuel-air mixture ratio control means, a warped surface, means for adjusting said control means and said timing device from an actuating point of said surface, and means for varying the actuating point of said surface to regulate said ratio and said ignition timing as a preselected function of the coordinates of said actuating point.

12. A carburetor for an engine having an adjustable ignition timing device, fuel-air mixture ratio control means in said carburetor, cam means adjustable in two ways and having a warped surface for actuating said timing device and said control means, and means for altering the adjustment of said cam means in said two ways with changes of preselected engine operative conditions whereby said mixture ratio and ignition timing are dependent on said engine operative conditions.

13. A fuel metering device having mixture control means for regulating the engine fuel-air ratio, a warped surface adjustable in two ways relatively to said mixture control means for adjusting the latter, and means for varying the adjustment of said surface relative to said mixture control means in said two ways with changes of engine torque and engine speed respectively.

14. Fuel control device for engine having engine speed control means, said device including fuel control means, Venturi means, means for actuating said fuel control means upon changes of air density and differential pressure at said Venturi means to keep the engine fuel supply proportional to the engine air supply, mixture control means for controlling the ratio of proportionality therebetween, and an operative connection between said speed and mixture control means for varying said ratio with changes of engine speed.

15. An engine fuel metering device having means for regulating the fuel-air ratio, and means for controlling said first mentioned means in dependence upon the engine speed, the engine torque and an engine temperature.

16. An engine fuel metering device having means for controlling the fuel-air mixture ratio, and means for controlling said first mentioned means in dependence upon the engine speed and torque.

17. An engine fuel metering device including fuel-air mixture ratio control means, and means for controlling said first mentioned means in dependence upon the engine torque and an engine temperature.

18. A carburetor having Venturi means and Venturi air density responsive means for keeping the engine fuel supply proportional to the engine air comsumption, fuel to air ratio control means, and means for adjusting said control means to vary said ratio in dependence upon the engine speed.

19. An engine fuel metering device having Venturi means and Venturi air density responsive means for regulating the engine fuel supply to maintain the engine fuel to air ratio independent of changes of engine air consumption and altitude, means for varying said ratio in dependence upon the engine speed and manifold pressure; and manual control means for altering said ratio.

20. An engine fuel metering device having fuel to air ratio control means, and means operatively connected with the latter for altering said ratio in dependence upon the engine speed and induction pressure and for increasing said ratio with an increase of engine cylinder temperature.

21. An engine fuel metering device having Venturi means and Venturi air density responsive means for keeping the engine fuel supply proportional to the engine air consumption, means for regulating the fuel-air proportionality ratio, and means for controlling said ratio in dependence upon the engine speed and manifold air pressure.

22. An aircraft engine fuel metering device having Venturi air density and differential pressure responsive means for regulating the engine fuel supply proportionally to the engine air consumption regardless of altitude changes, fuel to air mixture control means for controlling the ratio therebetween, and means for varying the adjustment of said control means to alter said ratio upon change of torque.

23. An aircraft engine fuel metering device having Venturi means and means responsive to Venturi differential air pressure and Venturi air density for keeping the engine fuel supply proportional to the engine air consumption regardless of the altitude, fuel to air mixture control means for regulating the ratio therebetween, and means for adjusting said mixture control means in dependence upon the engine speed and the torque.

24. A fuel metering device for aircraft engine provided with engine speed control means and engine cylinder temperature responsive means, said device having fuel to air mixture ratio control means actuated by said first and second mentioned means whereby said ratio is regulated in dependence upon the engine speed and increases at high engine cylinder temperature.

25. An engine fuel metering device having a fuel to air ratio control member, and means for actuating said member to alter said ratio upon variations of engine manifold pressure and increase said ratio upon increase of an engine operative temperature.

26. An engine fuel metering device having a fuel to air mixture ratio control member, and means for actuating the latter to vary said ratio with changes of engine speed and increase said ratio upon increase of an engine operative temperature.

27. An engine fuel metering device having Venturi means connected with the engine air induction system, means for decreasing the engine fuel supply with increase of the Venturi air temperature, and means for increasing said supply as the engine cylinder temperature increases beyond a predetermined limit.

28. An engine fuel metering device having Venturi means, and means for varying the engine fuel supply with changes of Venturi air density, engine load and engine operative temperature.

29. A carburetor having Venturi means, means for increasing the engine fuel supply with increase of Venturi air pressure, decrease of Venturi air temperature and increase of Venturi differential pressure; means for regulating said supply in dependence upon the engine manifold pressure, and means for increasing said supply upon increase of engine cylinder temperature.

30. An engine fuel metering device having means for regulating the engine fuel supply proportionally to the engine air consumption and means for controlling the fuel to air ratio therebetween, means for actuating said second mentioned means to adjust said ratio in dependence upon the engine induction pressure and to increase said ratio as the engine cylinder temperature increases beyond a predetermined value, and means under the control of the operator for actuating said second mentioned means.

31. An aircraft engine fuel metering device having fuel to air mixture ratio control means, and means for actuating said control means to regulate said ratio in dependence upon the torque and increase said ratio as the engine cylinder temperature increases beyond preselected limits.

32. An engine fuel metering system in which the engine liquid fuel supply is controlled by Venturi means, Venturi air pressure and temperature responsive means, and torque responsive means.

33. An engine fuel metering system in which the engine supply of liquid fuel is controlled by Venturi means, Venturi air pressure and temperature responsive means, engine manifold pressure responsive means, and engine speed control means.

34. An engine fuel metering system in which the engine supply of liquid fuel is controlled by Venturi means, Venturi air pressure and temperature responsive means, torque responsive means, and engine speed responsive means.

35. In combination with an engine fuel metering device having fuel to air ratio control means, and an engine ignition system having timing control means, means connected with said first and second control means for varying said ratio and timing in dependence upon the engine speed and manifold pressure.

36. In combination with an engine fuel metering device having fuel to air ratio control means, and an engine ignition system having timing control means, means connected with said first and second control means for varying said ratio and timing in dependence upon the engine manifold pressure and an engine operative temperature.

37. An engine fuel metering device including pressure and temperature responsive means connected with the engine air induction system to vary the engine fuel supply substantially in proportion to changes of engine air supply, and means for altering the ratio of proportionality therebetween in dependence upon the engine speed, the engine manifold air pressure and an engine operative temperature.

FERDINANDO CARLO REGGIO.